United States Patent [19]

Hinney et al.

[11] Patent Number: 4,593,128

[45] Date of Patent: Jun. 3, 1986

[54] STABILIZED POLYHYDROXYBUTADIENE COMPOUNDS

[75] Inventors: Harry R. Hinney, Springfield; John R. Murphy, Wayne, both of Pa.

[73] Assignee: Atlantic Richfield Company, Los Angeles, Calif.

[21] Appl. No.: 648,844

[22] Filed: Sep. 7, 1984

[51] Int. Cl.$^4$ .................... C07C 29/64; C08K 5/50
[52] U.S. Cl. .................... 568/701; 524/154; 528/51; 525/123
[58] Field of Search .......... 524/154; 528/51; 568/701

[56] References Cited

U.S. PATENT DOCUMENTS

| | | | |
|---|---|---|---|
| 3,932,353 | 1/1976 | Mastrolia et al. | 524/255 |
| 4,405,817 | 9/1983 | Murphy et al. | 568/701 |
| 4,436,881 | 3/1984 | Laitar | 528/51 |
| 4,439,570 | 3/1984 | Messina et al. | |

FOREIGN PATENT DOCUMENTS 78244  5/1983  European Pat. Off. ............ 524/154

*Primary Examiner*—John Kight
*Assistant Examiner*—Kriellion Morgan
*Attorney, Agent, or Firm*—Delbert E. McCaslin

[57] ABSTRACT

Polyhydroxybutadiene compounds are storage stabilized against reactivity changes by incorporating therein an effective amount of a di or triphenyl phosphine compound of the formula

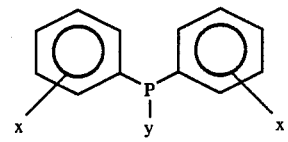

wherein each x is hydrogen, a halogen or an alkyl or alkoxy group having from 1 to 10 carbon atoms and y is an alkyl group having from 1 to 10 carbon atoms or an aryl group which may be substituted with a halogen or an alkyl or alkoxy group having from 1 to 10 carbon atoms.

6 Claims, No Drawings

STABILIZED POLYHYDROXYBUTADIENE COMPOUNDS

BACKGROUND OF THE INVENTION

The present invention is directed to a method for the storage stabilization of polyhydroxybutadienes (hydroxy-containing butadiene homopolymers). More specifically, the invention relates to stabilization from reactivity changes and especially increases in reactivity with isocyanates to prepare urethane compounds which may be used in the aerospace industry as a major component in the binder of solid propellant systems. Reactivity of the polyhydroxybutadienes increases over a period of time upon storage at ambient conditions. This increase is extremely undesirable and poses problems for the formulators because operating parameters must be periodically changed, resulting in additional expense. Furthermore, the urethane polymer obtained from the reaction may exhibit inferior physical properties compared to that prepared with a newly manufactured lot of polyhydroxybutadiene resin.

Various stabilizers, antioxidants, etc. have been proposed for incorporation into polyhydroxybutadiene compounds in attempts to prevent the reactivity changes upon ambient storage. Such additives include hindered phenols such as 2,2'-methylene bis (4-methyl-6-t-butyl phenol), substituted amines such as N-phenyl-N'-cyclohexyl-p-phenylenediamine and phosphites such as phenyldidecyl phosphite as well as combinations of the hindered phenol and phosphites mentioned above. All such additives have certain drawbacks in that they are either ineffectual, are not long lasting or will react with the isocyanate in the preparation of urethanes to introduce undesirable variations into the final urethane formulations.

It has now been discovered that polyhydroxybutadienes (hydroxy-containing butadiene homopolymers) can be effectively storage stabilized with long lasting effect by incorporating into the polymer resin a di or triphenylphosphine compound. The addition of the phosphine compound has the following advantages: (1) effectively prevents reactivity changes from occurring, (2) partially restores material to original reactivity after aging has taken place, (3) results in colorless solutions, (4) compounds are nonvolatile and (5) are nonreactive.

Applicants are not aware of any truly pertinent art that is deemed to be anticipatory or suggestive of the concept of the present invention.

It is therefore an object of this invention to provide a novel method for storage stabilizing polyhydroxybutadienes against reactivity changes when reacted with isocyanate compounds to prepare urethanes.

These and other objects and advantages of this invention will become apparent from the description of the invention which follows and from the claims.

DESCRIPTION OF THE INVENTION

According to the present invention, polyhydroxybutadienes (hydroxy-containing butadiene homopolymers) are stabilized against reactivity changes which occur during storage thereof by incorporating therein from about 0.2 to 5.0 and preferably between 0.5 to 2.0 percent by weight of a diphenylphosphine or triphenylphosphine compound or mixtures thereof having the general formula

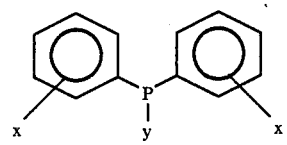

wherein each X is independently hydrogen, a halogen or an alkyl or alkoxy group having from 1 to 10 carbon atoms and Y is an alkyl group having from 1 to 10 carbon atoms of an aryl group which may be substituted with a halogen or an alkyl or alkoxy group having from 1 to 10 carbon atoms.

The polyhydroxybutadiene homopolymers which may be stabilized by the present invention will have a viscosity range of from about 5 to 300 or up to about 550 poises at 30° C. Preferably the homopolymers have a viscosity of about 35 to 60 poises. Thus, the polyhydroxybutadiene homopolymers are liquid or flowable semi-solid, at least when subjected to moderate pressure, at ambient temperatures or at temperatures up to about 200° C. The hydroxyl-containing butadiene homopolymers will have molecular weights in the range of about 400 to 10,000 or higher as determined by cryoscopic, ebullioscopic or osomometric methods.

The polyhydroxybutadiene (hydroxy-containing butadiene homopolymers) stabilized according to this invention differ from diene polymers known to be telechelic and-or hydroxy-containing in that the majority of unsaturation in the former is in the main hydrocarbon chain and in that the hydroxy components are in predominantly terminal positions on the main hydrocarbon chain and are predominantly primary and allylic in configuration. Ordinarily, at least about 1.8, often at least about 2 or more, frequently 2.1 to 2.8 and up to about 3 or more hydroxyl groups are present on the average per polymer molecule. Since these hydroxyl groups are predominantly primary, terminal and allylic in structure, with approximately two of the hydroxyl groups being at terminating positions on the main carbon chain, the polymers are highly reactive.

The dienes which are employed to make the polyhydroxybutadienes include the unsubstituted, 2-substituted or 2,3-disubstituted 1,3-dienes of 4 up to about 12 carbon atoms. The diene preferably has up to 6 carbon atoms and the substituents in the 2- and/or 3-position may be hydrogen, alkyl, generally lower alkyl, e.g., of 1 to 4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, 2-phenyl-1,3-butadiene, 2-methyl-3-phenyl-1,3-butadiene or mixtures thereof, etc. The choice of diene will usually depend upon properties desired in the final elastomer or urethane.

Although polyhydroxybutadienes of the above-described type, averaging more than one predominantly primary hydroxyl per molecule, say about 1.8 to 3 or more per molecule, may be stabilized by the method of this invention, they preferably have an average of at least 2 or more or about 2.1 to 2.4 up to 2.8 hydroxyl groups per molecule and the hydroxyl groups are predominantly in terminal allylic positions on the main, generally longest, hydrocarbon chain of the molecule. By "allylic" configuration is meant the alpha-allylic grouping of allylic alcohol; that is, the terminal hydroxyls of the intermediate polymer are attached to a carbon adjacent to a double-bond carbon.

The ratio of cis-1,4 and trans-1,4 and 1,2-vinyl unsaturation which occurs in the diene polymers stabilized by the present invention, the number and location of the hydroxyl groups and the molecular weight of the polymers can be a function of polymerization temperature and the type of addition polymerization system employed in forming the polymer. It has been found that diene polymers of the desired configuration can be obtained using hydrogen peroxide as the initiator for polymerization in a mutual solvent system. This free-radical addition polymerization usually takes place in solution at a temperature above about 100° to 200° C.

The reaction preferably akes place in a mutual solvent system; that is, one which dissolves both the diene monomer and the hydrogen peroxide. Suitable solvents include isopropanol, methanol, sec-butanol, acetone, n-butanol, n-propanol, methyl ethyl ketone and the like, saturated alcohols or ketones preferably alkanols, having 2 to about 12 carbon atoms. The $H_2O_2$—solvent system is found to supply hydroxyl groups and solvent effects needed to produce the diene polymers of desired chemical and physical characteristics. In such a polymerization system the alcohol or ketone serves as a solvent for the peroxide and as a solvent or diluent for the diene monomer and is used in an amount suitable to promote adequately rapid but controllable polymerization of the monomer material in the solution to form the diene polymers. The solvent will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$—solvent system may also contain ethers, alcoholketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 percent to 15 percent of the reaction mixture to assure a low molecular weight addition polymer product having more than two hydroxyl groups per molecule.

The intermediate polyhydroxy polymers of butadiene will have the majority of their unsaturation in the main carbon chain and will conform to the following simplified chemical structure:

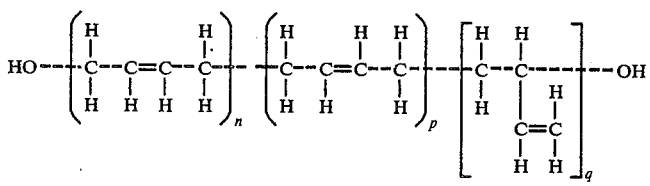

in which n plus p is greater than q; that is, the in-chain unsaturation accounts for more than 50 percent of the unsaturation. One or more of the hydrogens appearing in the above formula may be replaced by hydroxyl or hydroxyl-bearing groups in some of the molecules. This formula should not be understood as implying that the polymers are necessarily in blocks, but the cis-1,4, trans-1,4 and vinyl (1,2) unsaturation are usually distributed throughout the polymer molecule. Generally, n will be a number sufficient to give a cis-1,4-unsaturation content of about 10-30 percent; p will be a number sufficient to give a trans-1,4-unsaturation content to the polymer in the range of about 40-70 percent while q will be sufficient to give a pendant 1,2-vinyl unsaturation of about 10-35 percent. Often, the polymer will contain largely trans-1,4-units, e.g., about 50-65 percent and about 15-25 percent cis-1,4-units, with about 15-25 percent 1,2-units. Branching may also occur in the above polymers, especially those prepared at higher temperatures. These hydroxyl terminated polybutadienes are usually low molecular weight liquid polymers composed mainly of butadiene units in their backbone structure.

Polybutadiene ("Poly bd" R45M—sold commercially by Arco Chemical Company, Division of Atlantic Richfield Company) stabilized by the method of the present invention is a polyhydroxybutadiene homopolymer typically having a viscosity of about 50 poises at 30° C., a hydroxyl value of between 0.70 and 0.80 meq./gm., a hydroxyl number (mg.KOH/gm.) of between 39 and 45, an average molecular weight of 2800, and between about 2.1-2.3 hydroxyl functionality.

A polyhydroxybutadiene may also be prepared having a visocity of 223 poises at 30° C., a hydroxyl content of 0.68 meq./gm., an average molecular weight of about 3800 and a hydroxyl functionality of about 2.6. This type homopolymer can be prepared by polymerizing 100 parts butadiene in the presence of 35 parts isopropanol and 6 parts of 50 percent $H_2O_2$ for 3 hours at 130° C.

The di- and triphenylphosphine compounds having the formula hereinabove described which may be employed with the polyhydroxybutadiene resins include, for example, triphenylphosphine, tris (4-tolyl) phosphine, diphenyl-4-tolyl phosphine, diphenyl-4-bromophenyl phosphine, diphenyl-4-chlorophenyl phosphine, diphenyl-2-methoxyphenyl phosphine, diphenyl-2-ethoxyphenyl phosphine, diphenyl-2-butoxyphenyl phosphine, etc., diphenyl-n-butyl phosphine, diphenyl-n-octyl phosphine, diphenyl-n-propyl phosphine and the like. Triphenylphosphine is the preferred stabilizer. The stabilizing compounds are simply mixed with the polyhydroxybutadiene resin at any reasonable temperature in order to insure complete solution. Standard handling procedures for the resin after addition of the stabilizer compound is adequate. The amount of stabilizer employed should be adjusted to provide adequate stabilization against the undesired reactivity changes which occur on storage and is preferably in the range of from about 0.5 to about 2.0 percent by weight based on the weight of the polyhydroxybutadiene resin.

The following examples are provided to illustrate the invention in accordance with the principles of this invention, but are not to be construed as limiting the invention in any way except as indicated by the appended claims.

EXAMPLE 1

Into a 2000 ml resin kettle equipped with a mechanical stirrer were placed 990 grams of polyhydroxybutadiene ("Poly bd" R45M) and 10 grams of triphenylphosphine. The suspension was heated in an oil bath at 37°–93° C. with stirring until solution was complete.

The 1% triphenylphosphine-polyhydroxybutadiene solution was stored in an oven equipped with an air circulator at 57° C. Samples were periodically withdrawn and subjected to a gel time determination.

Gel time is here defined as the time it takes for an uncatalyzed reaction mixture of the polyhydroxybutadiene with a diphenylmethane diisocyanate (Isonate 143L sold commercially by the Upjohn Company) to reach a viscosity of 100,000 cps in a 25° C. constant temperature bath. Isonate 143L is a carbodiimide modified 4,4'-diphenylmethane diisocyanate having a specific gravity of 1.244 20/20° C., an isocyanate equivalent of 143.5, NCO content of 29.3 weight % and a viscosity of 35 cps. at 25° C.

Gel time determination is performed as follows: Into an 8 ounce wide mouth jar, 180.1 grams of polyhydroxybutadiene resin (hydroxyl value=0.73 meq/g) with stabilizer is added with 19.9 grams of diphenylmethane diisocyanate (Isonate 143L) with concurrent vigorous stirring with a propeller stirring shaft. Vigorous and thorough stirring is continued for 1 minute. The reaction mixture is placed in a constant temperature bath at 25±0.1° C. for 4 minutes. During this time, a Brookfield RVT viscometer equipped with a standard spindle #6 is placed into the reaction mixture. After a total of 4 minutes in the constant temperature bath, the viscosity is determined (time=0). A viscosity reading is taken at 5–10 minute intervals until the viscosity reaches 100,000 cps. This gel time is a measure of the reactivity of the polyhydroxybutadiene resin.

The 1% triphenylphosphine stabilized polyhydroxybutadiene solution gave the following results as compared to a blank solution of polyhydroxybutadiene.

| 57° C. Aging Time (months) | Triphenylphosphine gel time (minutes) | Triphenylphosphine viscosity (cps 25° C.) | Blank gel time (minutes) | Blank viscosity (cps 25° C.) |
|---|---|---|---|---|
| 0 | 83 | 5996 | 81 | 6193 |
| 1 | 94 | 5890 | 68 | 6430 |
| 2 | 95 | 5701 | 55 | 6684 |
| 3 | 94 | 6016 | 53 | 7008 |
| 4 | 94 | 6045 | 52 | 7373 |
| 5 | 93 | 5996 | 48 | 7176 |

EXAMPLE 2

The procedure of Example 1 was repeated employing various % by weight concentrations of triphenylphosphine based on polyhydroxybutadiene (R45HT). The results are shown in Table 1 below along with a comparison on a blank unstabilized polyhydroxybutadiene. The period covered 4 months with aging at 57° C.

TABLE 1

TRIPHENYLPHOSPHINE CONCENTRATION POLYHYDROXYBUTADIENE (R-45M) STABILITY

| 57° C. Aging Time (months) | 0% Gel Time (min.) | 0% Vis.* (cps 25° C.) | 0.1% Gel Time (min.) | 0.1% Vis.* (cps 25° C.) | 0.2% Gel Time (min.) | 0.2% Vis.* (cps 25° C.) | 0.5% Gel Time (min.) | 0.5% Vis.* (cps 25° C.) | 1.0% Gel Time (min.) | 1.0% Vis.* (cps 25° C.) | 2.0% Gel Time (min.) | 2.0% Vis.* (cps 25° C.) | 5.0% Gel Time (min.) | 5.0% Vis.* (cps 25° C.) |
|---|---|---|---|---|---|---|---|---|---|---|---|---|---|---|
| 0 | 79 | 5996 | 81 | 5996 | 82 | 5996 | 82 | 5996 | 83 | 5996 | 87 | 5996 | 89 | 5347 |
| 1 | 67 | 6586 | 62 | 6547 | 77 | 6488 | 87 | 6390 | 89 | 5898 | 90 | 6193 | 95 | 5544 |
| 2 | 61 | 6684 | 62 | 6488 | 70 | 6488 | 82 | 6527 | 90 | 6045 | 86 | 5996 | 96 | 5701 |
| 4 | 56 | 6979 | 58 | 6979 | 62 | 6783 | 73 | 6979 | 90 | 6193 | 95 | 6488 | 97 | 5996 |

*Vis. is Viscosity (cps 25° C.)

EXAMPLES 3–9

In Examples 3–9, which follow in table form, the procedures of Example 1 was repeated employing 1% by weight of various stabilizers with the same polyhydroxybutadiene (R-45M) and diphenylmethane diisocyanate (Isonate 143L) of Example 1. The gel time and viscosities showing the effect of the stabilizers for a 2 month aging period are set forth in Table 2 below.

TABLE 2

| Example No. | Stabilizer (1% by wt.) | 0 months Gel Time (min.) | 0 months Viscosity (cps 25° C.) | 1 month Gel Time (min.) | 1 month Viscosity (cps 25° C.) | 2 months Gel Time (min.) | 2 months Viscosity (cps 25° C.) |
|---|---|---|---|---|---|---|---|
| 3 | Tris (4-tolyl) phosphine | 84 | 6036 | 87 | 6390 | 89 | 6586 |
| 4 | Diphenyl-4-tolyl phosphine | 85 | 5996 | 90 | 6193 | 91 | 6193 |
| 5 | Diphenyl-4-bromo-phenyl phosphine | 82 | 5996 | 88 | 6091 | 90 | 6291 |
| 6 | Diphenyl-2-methoxy-phenyl phosphine | 85 | 6036 | 87 | 6390 | 90 | 6586 |
| 7 | Diphenyl-2-butoxy-phenyl phosphine | 85 | 6080 | 88 | 6291 | 88 | 6485 |
| 8 | Diphenyl-n-butyl phosphine | 74 | 6095 | 74 | 6095 | 76 | 6193 |
| 9 | Diphenyl-n-octyl phosphine | 74 | 6018 | 75 | 6032 | 77 | 6137 |

We claim:

1. A method for the storage stabilization of liquid or flowable semi-solid polyhydroxybutadiene compounds against changes in reactivity with isocyanate compounds to prepare urethanes which consists essentially of incorporating in said polyhydroxybutadiene from about 0.2 to 5.0 percent by weight of a di- or triphenylphosphine compound having the formula

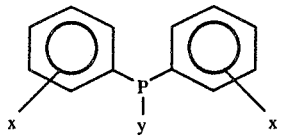

wherein each x is independently hydrogen, a halogen or an alkyl or alkoxy group having from 1 to 10 carbon atoms and y is an alkyl group having from 1 to 10 carbon atoms or an aryl group which may be substituted with a halogen or an alkyl or alkoxy group having from 1 to 10 carbon atoms.

2. A method according to claim 1 wherein the di- or triphenylphosphine compound is selected from the group consisting of triphenylphosphine, tris (4-tolyl) phosphine, diphenyl-4-tolyl phosphine, diphenyl-4-bromophenyl phosphine, diphenyl-2-methoxyphenyl phosphine, diphenyl-2-butoxyphenyl phosphine, diphenyl-n-butyl phosphine and diphenyl-n-octyl phosphine.

3. A method according to claim 2 wherein the compound is triphenylphosphine.

4. A method according to claim 1 wherein the di- or triphenylphosphine compound is employed in an amount of from 0.5 to 2.0 percent by weight.

5. A method according to claim 4 wherein the compound is triphenylphosphine.

6. A storage stabilized polyhydroxybutadiene composition prepared by the method of claim 1.

* * * * *